United States Patent [19]

Carswell et al.

[11] Patent Number: 5,070,110

[45] Date of Patent: Dec. 3, 1991

[54] BLENDS OF ALKYLENE GLYCOLS AND RELATIVELY HIGH EQUIVALENT WEIGHT ACTIVE HYDROGEN COMPOUNDS CONTAINING MULTIPURPOSE ADDITIVES

[75] Inventors: Robert Carswell; Hugo E. Bernardi, both of Lake Jackson, Tex.

[73] Assignee: The Dow Chemical Company, Midland, Mich.

[21] Appl. No.: 398,802

[22] Filed: Aug. 25, 1989

[51] Int. Cl.[5] .................. C08G 18/16; C08G 18/18
[52] U.S. Cl. ............................. 521/51; 521/155; 521/163
[58] Field of Search ............... 521/105, 51, 137, 163, 521/155; 528/73

[56] References Cited

U.S. PATENT DOCUMENTS

| | | | |
|---|---|---|---|
| 3,753,933 | 8/1973 | Olstowski et al. | 521/170 |
| 4,125,487 | 11/1978 | Olstowski | 521/137 |
| 4,239,857 | 12/1980 | Harper | 521/121 |
| 4,269,945 | 5/1981 | Vanderhider et al. | 521/159 |
| 4,296,212 | 10/1981 | Ewen et al. | 521/163 |
| 4,362,824 | 12/1982 | Dominguez et al. | 521/118 |
| 4,433,067 | 2/1984 | Rice et al. | 521/51 |
| 4,435,349 | 3/1984 | Dominguez et al. | 264/257 |
| 4,444,910 | 4/1984 | Rice et al. | 521/51 |
| 4,485,031 | 11/1984 | Olstowski et al. | 252/182 |
| 4,485,032 | 11/1984 | Olstowski et al. | 252/182 |
| 4,547,478 | 10/1985 | Chang | 502/154 |
| 4,548,919 | 10/1985 | Megna | 502/154 |
| 4,575,518 | 3/1986 | Rasshofer et al. | 521/51 |
| 4,585,803 | 4/1986 | Nelson et al. | 521/105 |
| 4,595,743 | 6/1986 | Laughner et al. | 528/73 |
| 4,673,696 | 6/1987 | Tsai | 521/172 |
| 4,719,247 | 1/1988 | Lin et al. | 521/159 |
| 4,742,091 | 5/1988 | Grigsby, Jr. et al. | 521/163 |
| 4,745,137 | 5/1988 | Thomas et al. | 521/137 |
| 4,751,251 | 6/1988 | Thornsberry | 521/112 |
| 4,751,253 | 6/1988 | Tylenda | 521/114 |
| 4,753,966 | 6/1988 | Haas et al. | 521/51 |
| 4,755,321 | 7/1988 | Moss et al. | 252/182.24 |
| 4,766,172 | 8/1988 | Weber et al. | 524/783 |
| 4,774,263 | 9/1988 | Weber et al. | 521/51 |
| 4,774,264 | 9/1988 | Weber et al. | 521/51 |

FOREIGN PATENT DOCUMENTS

| | | |
|---|---|---|
| 260685 | 3/1988 | European Pat. Off. . |
| 81701 | 4/1988 | European Pat. Off. . |
| 303105 | 2/1989 | European Pat. Off. . |

OTHER PUBLICATIONS

R. C. Mehrotra and V. D. Gupta in *J. Organometallic Chem.* 4, pp. 145-150.

Wm. J. Considine in *J. Organometallic Chem.* 1965, 5, pp. 263-266.

A. Pauperio and R. N. Santos in *Exploring New Horizons*, 1986, pp. 240-243.

*Primary Examiner*—John Kight, III
*Assistant Examiner*—Shelley A. Wright

[57] ABSTRACT

A compatibilized active hydrogen compound-alkylene glycol composition comprises components (A) a relatively high equivalent weight material having an average of at least about 1.8 active hydrogen containing groups per molecule and a weight from about 500 to about 5000 per active hydrogen containing group; (B) an alkylene glycol which is incompatible with component (A) at the relative proportions thereof present in the composition; said composition having dissolved therein: (C) a compatibilizing and catalytic amount of an additive containing (1) a urea compound and (2) a transition metal salt of a carboxylic acid wherein said metal is selected from Groups I-B, II-B, V-A, IV-B, V-B, VI-B, VII-B or VIII of the Periodic Table of the Elements; said composition containing a sufficient quantity of at least one amine group-containing material such that component (2) is soluble in said composition. Such compositions are useful in producing polyurethanes, particularly polyurethanes exhibiting relatively short demold times and good mold release properties.

30 Claims, No Drawings

BLENDS OF ALKYLENE GLYCOLS AND RELATIVELY HIGH EQUIVALENT WEIGHT ACTIVE HYDROGEN COMPOUNDS CONTAINING MULTIPURPOSE ADDITIVES

BACKGROUND OF THE INVENTION

This invention relates polyurethanes and to compositions of relatively high equivalent weight active hydrogen compounds and alkylene glycols, said compositions containing materials that make the compositions useful in preparing polyurethanes.

In making polyurethanes mixtures of a relatively high equivalent weight active hydrogen compound and a relatively low equivalent weight chain extender compound are reacted with a polyisocyanate. Using alkylene glycols as chain extenders often produces advantageous properties in resulting polyurethanes.

Alkylene glycol chain extenders are, however, often incompatible with relatively high equivalent weight active hydrogen compounds in amounts used to make polyurethane polymers. Therefore, the relatively high equivalent weight active hydrogen compound is often blended with the alkylene glycol just prior to use. Alternatively, an additional component which compatibilizes the alkylene glycol with the relatively high equivalent weight active hydrogen compound may be used. For instance, the use of urea and certain substituted ureas as compatibilizing agents is taught in U.S. Pat. Nos. 4,485,031 and 4,485,032.

Use of compatibilizing agents is generally preferred because such use allows shipping and storage of blends of relatively high equivalent weight active hydrogen compounds and chain extenders. In many instances, the blends also contain other materials used in preparing polyurethanes, such as catalysts and certain additives. The reactivity of blends containing relatively high equivalent weight active hydrogen compounds, alkylene glycol chain extenders, compatibilizers having amine or urea functional groups and tin-containing catalysts such as certain dialkyl tin dicarboxylates often diminishes during storage.

Some blends of polyether polyols and alkylene glycols compatibilized with ureas taught in U.S. Pat. No. 4,485,032 show sufficient reactivity with isocyanates to form polyurethanes in the absence of tin carboxylate catalysts, but require 60 second demold times which exceeds the preferable demold times in automatic RIM processes.

Accordingly, it would be desirable to provide a compatibilized blend of relatively high equivalent weight active hydrogen compounds and glycol which blend contains materials catalytic for polyurethane formation and exhibits relatively stable reactivity over time. It would also be desirable for the blend to have sufficient catalytic activity to produce polyurethanes which can be demolded in less than about 60 seconds. Preferably, the blend would also provide mold release properties for a polyurethane produced from the blend.

SUMMARY OF THE INVENTION

In one aspect, the invention is a compatibilized active hydrogen compound-alkylene glycol composition comprising components:

(A) a relatively high equivalent weight active hydrogen compound material having an average of at least about 1.8 active hydrogen containing groups per molecule and an average molecular weight from about 500 to about 5000 per active hydrogen containing group; with component (A) at the relative proportions thereof present in the composition: said composition having dissolved therein:

(C) a compatibilizing and catalytic amount of an additive containing component (1) a urea compound and component (2) a transition metal salt of a carboxylic acid wherein said metal is selected from Groups I-B, II-B, V-A, IV-B, V-B, VI-B, VII-B or VIII of the Periodic Table of the Elements: said composition containing a sufficient quantity of at least one amine group-containing material such that component (2) is soluble in said composition.

In other aspects, the invention includes polyurethane polymers prepared from the compositions of the invention and processes of preparing such polymers.

Compositions of the invention are compatibilized and additionally exhibit catalytic activity in forming polyurethanes. The catalytic activity is advantageously sufficient for use of the compositions in automatic RIM processes without additional catalyst. Additionally, polymers formed from the compositions of the invention exhibit self releasing characteristics.

DETAILED DESCRIPTION OF THE INVENTION

One component of the composition of this invention is a relatively high equivalent weight active hydrogen compound. The term "relatively high equivalent weight" is used to refer to an equivalent weight (molecular weight per active hydrogen-containing group e.g. —OH, —NH$_2$, —SH) of at least about 500, preferably from about 500 to about 5000. The equivalent weight is preferably from about 700 to about 3000, and more preferably from about 1000 to about 2000. The relatively high equivalent weight active hydrogen compound also advantageously contains an average of at least about 1.8, preferably from about 1.8 to about 6, more preferably about 2 to about 3, nominal active hydrogen containing groups per molecule. The active hydrogen groups are preferably hydroxyl groups, amine groups or mixtures thereof; more preferably hydroxyl groups.

Any suitable organic compound containing at least two active hydrogen containing groups as determined by the Zerewitinoff method may be used as an active hydrogen compound. Active hydrogen compounds are compounds having hydrogen containing functional groups which will react with an isocyanate group. The Zerewitinoff test described by Kohler in the *Journal of the American Chemical Society*, Vol. 49, page 3181 (1927) predicts the tendency of a hydrogen-containing group to react with isocyanates. Suitable active hydrogen compounds are those conventionally employed in the preparation of polyurethanes such as the compounds described in U.S. Pat. No. 4,394,491, particularly in columns 3 through 5 thereof, wherein the compounds are called polyakls, which patent is incorporated herein by reference in its entirety.

Relatively high equivalent weight active hydrogen components most commonly used in polyurethane production are those compounds having at least two hydroxyl groups, which compounds are referred to as polyols. Representatives of the suitable polyols are generally known and are described in such publications as *High Polymers*, Vol. XVI, "Polyurethanes, Chemistry and Technology" by Saunders and Frisch, Interscience Publishers, New York, Vol. I, pp. 32-42, 44-54 (1962) and Vol. II pp 5-6,198-199 (1964); *Kunststoff-Handbuch.* Vol. VII, Vieweg-Hochtlen, Carl-Hanser-Verlag, Munich, pp. 45-71 (1966): and *Organic Polymer Chemistry* by K. J. Saunders, Chapman and Hall, London, pp. 323-325 (1973): and *Developments in Polyurethanes,* Vol 1, J. M. Buist, ed., Applied Science Publishers (1978) pp. 1-76.

Typical polyols include polyester polyols, polyester amide polyols, and polyether polyols having at least two hydroxyl groups. Polyethers and polyesters having hydroxyl terminated chains are preferred for use as relatively high molecular weight active hydrogen containing compounds for use in polyurethanes suitable for use in the practice of the invention. Examples of polyols also include hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers, including polythioethers, acetals, including polyacetals.

Polyether polyols are preferably employed in the practice of this invention because they are resistant to hydrolysis. Also, polyether polyols often exhibit incompatibility with alkylene glycols. Preferred among polyether polyols are polyalkylene polyether polyols including the polymerization products of oxiranes or other cyclic ethers such as tetramethylene oxide in the presence of such catalysts as boron trifluoride, potassium hydroxide, triethylamine, tributyl amine and the like, or initiated by water, polyhydric alcohols having from about two to about eight hydroxyl groups, amines and the like. Illustrative alcohols suitable for initiating formation of a polyalkylene polyether include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane1,2,6-triol, alpha-methyl glucoside, pentaerythritol, erythritol, pentatols and hexatols. Sugars such as glucose, sucrose, fructose, maltose and the like as well as compounds derived from phenols such as (4,4'-hydroxyphenyl)2,2-propane, and the like are also suitable polyhydric alcohols for forming polyether polyols useful in the practice of the invention.

The polyether is more preferably a polymer of one or more $C_2$–$C_8$ cyclic ethers such as ethylene oxide, propylene oxide, butylene oxide, styrene oxide, tetrahydrofuran, and the like. Di- and/or trifunctional polymers of ethylene oxide and/or propylene oxide are preferred. The preferred polyethers are suitably block or random copolymers of propylene and ethylene oxide: but are more preferably block copolymers, most preferably block copolymers having ethylene oxide blocks at the termini of the polyethers such that there are primary hydroxyl groups on the polyethers. Such block copolymers are referred to as ethylene oxide capped polyols The ethylene oxide caps preferably comprise at least about 10 weight percent of the polyol to produce high reactivity desirable for RIM processes.

Polyamines are also suitable for use in relatively high equivalent weight active hydrogen components in polyurethanes and include polyether polyamines polyester polyamines: amine-functional polymers such as amine functional acrylates, amine terminated acetal resins, amine terminated urethanes, amine containing polyesters, and the like. Suitable amines include those having terminal primary or secondary aliphatic or aromatic amine groups, including those having terminal aromatic amine functionality such as p-amino phenoxy groups, p-amino m-methyl-N-phenyl carbamate groups and the like. Compositions of amines with polyols are also suitably used as active hydrogen components. When amines are used as at least a portion of the active hydrogen component, polyurea and polyureaurethane linkages are formed. Useful amines include polyoxyalkylene polyamines and cyanoalkylated polyoxyalkylene polyamines having equivalent weights preferably from about 500 to about 10,000 and, more preferably, from about 500 to about 5000.

Among amines, amine-terminated polyethers are preferred for use in the practice of the invention. Amine-terminated polyethers are prepared from the polyether polyols described above by animation thereof. Amination is described in U.S. Pat. Nos. 3,161,682: 3,231,619: 3,236,895: 3,436,359: 3,654,370 which are incorporated herein by reference. For amination, it is generally desirable that the terminal hydroxyl groups in the polyol be essentially all secondary hydroxyl groups for ease of amination. Secondary hydroxyl groups are introduced into a polyol produced from ethylene oxide by capping the polyol with higher alkylene oxides, that is, with alkylene oxides having more than two carbon atoms. Alternatively, secondary hydroxyl groups result from producing a polyol from higher alkylene oxides.

Generally, amination does not result in replacement of all the hydroxyl groups by amine groups. An animated polyether polyol is selected to have a percentage of amine groups relative to hydroxy groups of from 0 to 100, preferably from about 5 to about 95 percent, depending on the physical properties desired in a resulting polyurethane. The amine groups are generally primary, but secondary amine groups may be formed. Beneficially, the amine-terminated polyols have an average functionality of from about 2 to about 6 amine groups per molecule. In the case of amines, the term "functionality" is used herein to refer to the number of amine groups, whether they be primary or secondary, in the molecule. Advantageously, the amineterminated polyols have an average equivalent weight of at least about 500, preferably an average weight per active hydrogen-containing group from about 500 to about 5000, more preferably from about 500 to about 2500. The process of utilizing animated polyols disclosed in U.S. Pat. Nos. 4,530,941 and 4,444,910 illustrate processes for using such compounds. Those patents are incorporated herein by reference.

The composition also contains, as a chain extender, an alkylene glycol, preferably an $α,ω$-alkylene glycol, which is incompatible, in the absence of a compatibilizer, with the relatively high equivalent weight active hydrogen compound at the relative proportions thereof present in the composition. Suitable alkylene glycols include those having from about 2 to about 8, preferably about 2 to about 6, more preferably about 2 to about 4 carbon atoms because glycols with fewer carbon atoms on reacting with a polyisocyanate give rise to more crystaline hard segments Exemplary chain extenders include ethylene glycol, 1,4-butanediol, 1,6-hexamethylene glycol, 1,8-octanediol, and the like. Ethylene glycol and 1,4-butanediol are most preferred.

Although the composition suitably contains any amount of glycol chain extender at which the chain extender and relatively high equivalent weight active hydrogen compound are incompatible in the absence of a stabilizer, the composition preferably contains about 5 to about 60, more preferably about 10 to about 40 parts by weight of chain extender per 100 parts by weight relatively high equivalent weight active hydrogen compound because vitrification is often observed when there is more than about 40 parts of glycol. It has been found that polyurethanes having particularly desirable properties may be prepared from blends containing an amount of chain extender within the preferred and more preferred ranges.

In addition to the relatively high equivalent weight active hydrogen compound and glycol chain extender, compositions of the invention preferably contain at least one amine. When the relatively high equivalent weight active hydrogen compound contains amine groups, and both compatibility of the glycol in the composition and solution of the transition metal carboxylate are achieved without an additional amine compound, the additional amine compound is not needed. Otherwise, an additional amine is needed. Use of an amine compound is especially preferred when there are more than about 10 parts by weight of glycol per hundred parts by weight relatively high equivalent weight compound and when a flexural modulus of at least about 5,000 psi is desired in a polurethane prepared from the composition. Under certain circumstances the amine compound can additionally provide catalysis, chain extension, aid in mold release or other function. Exemplary of amines useful as chain extenders or cross-linking agents, for instance, are described in U.S. Pat. Nos. 4,269,945: 4,433,067 and 4,444,910 which are incorporated by reference in their entireties. Use as a compatibilizing agent, for instance, is described in Australian Patent Number 596,457, which is incorporated by reference in its entirety. Use as an active hydrogen component, for instance, is described in U.S. Pat. Nos. 4,719,247 and 4,742,091 which are incorporated by reference in their entireties. Use in an internal mold release composition, for instance, is described in or in U.S. Pat. No. 4,585,803 (which patent is incorporated by reference in its entirety).

Suitable amines which can be employed herein as a component in the composition of the invention include any aliphatic, cycloaliphatic, or aromatic compound containing at least one primary, secondary or tertiary amine group. The amines are, optionally, inertly substituted, that is, substituted with groups which do not undesirably interfere with the reactions of the amine group. Inert substitution includes, for instance, alkyl groups, cycloalkyl groups, aryl groups, arylalkyl groups, nitro groups, sulfate groups, sulfone groups, ether groups, hydroxyl groups, urethane groups, urea groups, and the like. Amines having alkyl, aryl, cycloalkyl, arylalkyl, ether, or hydroxyl groups are preferred.

Preferred amines include unsubstituted or ethersubstituted aliphatic or cycloaliphatic primary or secondary mono-amine compounds: trialkyl amines: hydroxyl amines, including alkyl diethanolamines, diethanolamine and dialkyl hydroxyl amines: tertiary amines such as those described by Nelson et al. in U.S. Pat. No. 4,585,803 and low equivalent weight aliphatic and aromatic amine active hydrogen containing compounds, such as amine terminated polyethers of less than about 500, preferably from about 200 to about 500 molecular weight, hexamethylene diamine, diethylenetriamine, and hydrocarbyl substituted aromatic amines such as, for example, diethylenetoluenediamine. A unsubstituted or ether-substituted aliphatic or cycloaliphatic primary mono-amine compound preferably contains from about 4 to about 8 carbon atoms. An unsubstituted or ether-substituted aliphatic or cycloaliphatic secondary mono-amine compound preferably contains from about 6 to about 12 carbon atoms. An alkyl diethanol amine preferably has an alkyl group containing from about 2 to about 8 carbon atoms. A dialkyl hydroxyl amine preferably contains about 4 to about 10 carbon atoms. In a trialkylamine, each alkyl group preferably has from about 2 to about 4 carbon atoms. Amines having these ranges of carbon atoms are preferred because these amines are effective compatibilizers. Amines described as useful with internal mold release agents in the copending application of Meyer et al. filed Jan. 12, 1984, Ser. No. 570,141, incorporated herein by reference in its entirety, are particularly preferred because they are effective in achieving solutions of the internal mold release agents.

Suitable amines include, for example, oleyl amine, coco amine, tall oil amine, ethanolamine, diethyltriamine, ethylenediamine, propanolamine, aniline, mixtures thereof and the like. Other exemplary amines include n-butylamine, amylamine, n-hexylamine, n-octylamine, sec-butylamine, 1-amino-2-ethoxyethane, 1-amino-1-methyl hexane, cyclohexylamine, di-n-propylamine, ethylpropylamine, di-n-butylamine, di-n-hexylamine, di-sec-butylamine, ethyldiethanolamine, n-propyldiethanolamine, n-butyldiethanolamine, n-hexyldiethanolamine, diethylhydroxylamine, di-n-propylhydroxylamine, di-n-butylhydroxylamine, triethylamine, tri(n-propyl)amine, tri(n-butyl)amine, ethyl di(n-propyl)amine, diethanolamine and the like. Suitable tertiary amines include triethylenediamine, N-methyl morpholine, N-ethyl morpholine, diethylethanolamine, N-coco morpholine, amino ethyl piperazine, 1-methyl-4-dimethylaminoethyl piperazine, 3-methoxy-N-dimethylpropylamine, N,N-diethyl-3diethylaminopropyla dimethylbenzyl amine and the like. Particularly suitable amines include animated polyoxyalkylene glycols, hexamethylene diamine, diethylene triamine: and hydrocarbyl substituted aromatic amines such as diethylene toluene diamine.

The amount of amine present is not critical to this invention, but is advantageously determined by the purpose served by the amine in a given blend of alkylene glycol and relatively high equivalent weight active hydrogen compound. For instance, there is sufficient amine to compatibilize the polyether polyol and alkyleneglycol according the teachings of Australian Patent Number 596,457 or to compatibilize a mold release agent according the teachings of U.S. Pat. No. 4,876,079 or U.S. Pat. No. 4,585,803. The invention is most useful in compositions containing sufficient amine to result in loss of activity of a tin-containing catalyst for the formation of polyurethanes. Preferably, at least about 0.1, more preferably about 0.05 to about 4, most preferably about 0.2 to about 1 part of amine is used per part of alkylene glycol chain extender because these amounts of amine aid in achieving compatibility of glycols in active hydrogen compounds using amounts of urea insufficient to result in gels in the active hydrogen composition. Most preferably, the composition contains about 0.5 to about 20, even more preferably from about 1 to about 20 parts of the amine per 100 parts of relatively high equivalent weight active hydrogen compound because these amounts of amine are effective in preparing solutions of transition metal carboxylates.

Compositions of the invention additionally contain at least one urea compound, which is suitably (unsubstituted) urea or a substituted urea. A substituted urea advantageously is an inertly substituted urea, that is it has substitution which does not interfere undesirably with compatibilization of the composition or with catalysis of the polyurethane-forming reaction. Urea compounds used in the practice of the invention preferably are of Formula I:

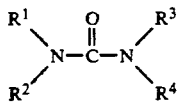

wherein $R^1$, $R^2$, $R^3$, and $R^4$ are inert substituents. Preferably, each of $R^1$, $R^2$, $R^3$, and $R^4$ are independently selected from the group consisting of hydrogen, alkyl groups, aryl groups, arylalkyl groups, cycloalkyl groups, which groups are unsubstituted or inertly substituted. The inert substituents on the groups include, for instance, ether groups such as alkoxy groups, aryloxy groups and the like: fluorine, hydrogen, chlorine and hydroxy groups. The alkyl groups preferably have from about 1 to about 20, more preferably from about 1 to about 5 carbon atoms and include, for instance methyl, ethyl, propyl, hydroxymethyl, methoxypropyl groups and the like. The aryl groups preferably have from about 6 to about 18, more preferably from about 6 to about 10 carbon atoms and include, for instance phenyl, p-fluorophenyl, 4-chlorophenyl, 4-methoxyphenyl groups and the like. The alkyl aryl groups preferably have from about 7 to about 30, more preferably from about 7 to about 25 carbon atoms and include, for instance p-methyl phenyl, m-ethylphenyl and the like. The arylalkyl groups preferably have from about 7 to about 10 carbon atoms and include, for instance benzyl, 2-phenylmethyl groups and the like. The cycloalkyl groups preferably have from about 4 to about 10 carbon atoms for instance cyclohexyl, methyl cyclohexyl, cyclobutyl groups and the like. The alkoxy groups preferably have from about 1 to about 25 and include, for instance methoxy, ethoxy, propoxy and the like. The aryloxy groups preferably have from about 6 to about 30, more preferably from about 6 to about 25 carbon atoms and include, for instance phenoxy, p-fluorophenoxy groups and the like. Substituents having the indicated ranges of carbon atoms are preferred because they exhibit solubility as well as combinations of catalytic and compatibilizing activity.

In Formula I, at least two of $R^1$, $R^2$, $R^3$, and $R^4$ are preferably hydrogen: more preferably, at least two of the hydrogen atoms are on the same carbon atom (e.g. $R^1$ and $R^2$ are both hydrogen). Most preferably, at least three, and even more preferably all 4 of $R^1$, $R^2$, $R^3$, and $R^4$ are hydrogen atoms to achieve maximum catalytic and compatibilizing efficiency. Preferred urea compounds include: urea, 1-methylurea, 1,1-diethyl urea. The most preferred compound is urea.

Additionally, there is at least one transition metal salt of a carboxylic acid (hereinafter transition metal carboxylate). The transition metal carboxylates are the salts of a metal cation from Groups IVB, VB, VIIB, VIII, IB, IIB and VA of the Periodic Table of the Elements with at least one carboxylate anion, that is the anion of an organic material having at least one carboxylic acid group. Although, all valences of the transition metals in the transition metal carboxylates are preferably filled with carboxylate anions: alternatively, the transition metal carboxylates include transition metal salts having metal-metal bonds, or, preferably, ionic bonds to anions other than carboxylate anions, but not bonds directly to carbon as in alkylmetals. The transition metals include such metals as Ti, Zr, Ta, Cr, Mn, Mo, Fe, Co, Ni, Cu, Sb, Bi, Zn and the like. Preferred metals are Zn, Cu, Sb, and Cd: more preferred, Sb, Cd and Zn: Zn, most preferred. These preferences are based on stability and reactivity under conditions present in polyurethane forming processes. Suitable carboxylate anions include anions of saturated or unsaturated carboxylic acids having from about 2 to about 30, preferably from about 8 to about 21 carbon atoms, more preferably from about 10 to about 18 carbon atoms because these chain lengths are more effective in internal mold release. Suitable transition metal carboxylates include zinc stearate, zinc laurate, zinc myristate, copper stearate, copper laurate, copper oleate, copper palmitate, cadmium laurate, cadmium stearate, cadmium palmitate: antimony laurate, antimony stearate, nickel stearate, nickel oleate, niclel palmitate, nickel laurate and the like. Particularly suitable are the zinc carboxylates which include, for example, zinc stearate, zinc oleate, zinc palmitate, zinc laurate, zinc stearoyl sarcosinate, zinc oleoyl sarcosinate, zinc palmitoyl sarcosinate, zinc lauroyl sarcosinate: with zinc stearate, zinc laurate, and zinc myristate preferred; and zinc laurate, most preferred.

Together, the urea compound and transition metal carboxylate are present in amounts sufficient to catalyze reaction of the active hydrogen-containing components with a polyisocyanate and in amounts sufficient to compatibilize the relatively high equivalent weight active hydrogen compound and the alkylene glycol in the composition. The term "compatibilize" is used herein to denote that the composition remains in a single phase for at least 10 days of storage at a temperature of at least about 20° C.

The presence of sufficient urea compound and transition metal carboxylate to provide sufficient reactivity of the composition in polyurethane formation is indicated by formation of a gel which generally rapidly forms a hard polymer within at least about 40 seconds, preferably from about 0.5 to about 25 seconds, more preferably from about 10 to about 20 seconds from mixing of active hydrogen and polyisocyanate components. Preferably there is sufficient catalytic activity to provide sufficient reactivity to permit removal of a molded part from the mold in less than 60 seconds from the time components are injected into the mold (a 60 second demold time). The demold time is preferably from about 1 to about 30 seconds, more preferably from about 1 to about 20 seconds because these are the demold time found useful in automated RIM processes. In the case of integral skin foams, however, longer demold times, preferably less than about 2 minutes are suitable. Integral skin foams generally have interior densities of from about 75 to about 450, preferably from about 150 to about 350 Kg/m3 (kilograms/cubic meter) whereas, other RIM produced polyurethanes generally have densities of from about 600 to about 1500, preferably from about 900 to about 1200 Kg/m3.

Preferably, the amounts of urea compound are sufficient to compatibilize the glycol and relatively high equivalent weight active hydrogen compound and preferably range from about 1 part urea compound to 1 part glycol to about 1 part urea compound to 15 parts glycol, more preferably from about 1 part urea compound to about 2 parts glycol to about 1 part urea compound to 12 parts glycol, most preferably from about 1 part urea compound to about 3 parts of glycol to about 1 part urea compound to 6 parts of glycol by weight. An excess of urea compound often results in formation of a gel in the active hydrogen composition, especially when urea rather than a substituted urea is used.

Preferably, from about 0.1 to about 10, more preferably from about 0.5 to about 5, most preferably from about 1 to about 3 parts by weight transition metal carboxylate per hundred parts by weight of the relatively high equivalent weight active hydrogen compounds are present. These ranges are preferred because, in the presence of the urea compounds, they provide sufficient reactivity of the composition.

The ratio of the urea compound to the transition metal carboxylate is preferably from about 1 4 to about 5:1, more preferably from about 1:2 to about 5:1 because these ratios provide sufficient reactivity and compatibility.

It is within the skill in the art to ascertain relative proportions of relatively high equivalent weight compound, alkylene glycol, urea compound, transition metal carboxylate, and, optionally, amine useful in a specific application using the teachings herein. Amounts required for compatibilization and catalysis are functions of characteristics of the composition such as the identity and amounts of components in the composition. For instance, when an amine present in the composition acts as a compatibilizer, the amount of urea compound needed for compatibilization is advantageously reduced. When another component, for instance, an amine has catalytic activity, relatively less urea compound and transition metal carboxylate are advantageously needed for catalysis.

The composition of this invention can be prepared by any admixing of the relatively high equivalent weight active hydrogen compound, glycol chain extender, urea compound and transition metal carboxylate that results in a homogeneous, compatibilized composition. Preferably, a first admixture of the urea and the glycol chain extender is formed, advantageously by shaking or stirring the materials together, advantageously at about room temperature. When an amine is used, a second admixture of the transition metal carboxylate and the amine is formed, advantageously by mixing them at a temperature of at least about 50° C. until there is no visible evidence of two phases, preferably for about 30 minutes. The two admixtures are, then, combined with the relatively high equivalent weight compound and stirred using mild heat, e.g. about 35° C., if necessary to achieve a single phase. The alternative of solubilizing the urea compound or the carboxylate in the isocyanate compounds cannot, however, be dismissed.

In addition to the foregoing critical components, other additives which are useful in preparing polyurethanes may be present in the stabilized composition. Among these additives are catalysts, blowing agents, surfactants, crosslinkers, antioxidants, UV absorbers, preservatives, colorants, particulate fillers, reinforcing fibers, antistatic agents, internal mold release agents and the like.

Suitable blowing agents, which are optionally employed herein, include water, halogenated methanes such as methylene chloride, dichlorodifluoromethane, trifluoromonochloromethane and the like, the so-called "azo" blowing agents, finely divided solids and the like. However, in preparing noncellular or microcellular polyurethanes the use of these blowing agents is not preferred. In making microcellular polyurethanes having a density from about 600 to about 500 kg/m$^3$, it is preferred to reduce density by dissolving or dispersing a gas such as dry air or nitrogen into the compatibilized composition prior to its reaction with a polyisocyanate.

Suitable surfactants include silicone surfactants and fatty acid salts, with the silicone surfactants being preferred. Such surfactants are advantageously employed in an amount from about 0.01 to about 2 parts per 100 parts by weight relatively high equivalent weight active hydrogen compound.

Suitable fillers and colorants include calcium carbonate, alumina trihydrate, carbon black, titanium dioxide, iron oxide, flaked or milled glass, mica, talc and the like. Suitable fibers include glass fibers, polyester fibers, graphite fibers, metallic fibers and the like.

While additional catalysts for forming polyurethanes are, optionally, present in addition to the amine, urea and transition metal carboxylate in the compositions of the invention, additional catalysts are advantageously not necessary and, preferably, are not used. When additional catalysts are used, they are preferably catalysts which do not exhibit a substantial loss of activity when stored with other components of the compositions for times suitable for particular applications. More preferably, the catalysts lose less than about 50, most preferably less than about 25 percent of their reactivity (as measured by gel time) when stored with other components of a composition of the invention for a period of at least about 6 months at a temperature of at least about room temperature (e.g. 25° C.). More preferably, tetravalent organometallic tin-containing catalysts which lose activity in the presence of amines, such as dialkyl tin dicarboxylates, tetraalkyl tins and tin oxides, particularly stannous oxide, are present in amounts insufficient to substantially increase the rate of polyurethane formation, (as measured by gel time). A increase of less than about 10 percent in gel time is considered insubstantial. Most preferably there is less than about 0.001 weight percent tetravalent tin catalyst which loses activity in the presence of amines present in a composition of the invention. Specific catalysts are within the skill in the art and include those catalysts described, for instance, in U.S. Pat. No. 4,269,945, particularly column 4, line 46 through column 5, line 25, which is incorporated herein by reference.

Active hydrogen component compositions of this invention are reacted with at least one polyisocyanate component to form a polyurethane. Both aliphatic and aromatic diisocyanates are useful for this purpose. Suitable aromatic diisocyanates include, for example, m-phenylene diisocyanate, p-phenylene diisocyanate, 2,4- and/or 2,6-toluene diisocyanate (TDI), naphthylene-1,5-diisocyanate, 1-methoxyphenyl-2,4-diisocyanate, 4,4'-biphenylenediisocyanate, 3,3'-dimethoxy-4,4-biphenyldiisocyanate, 2,4'- and/or 4,4'diphenylmethanediisocyanate (MDI) and derivatives thereof including polymeric derivatives. Preferred among the aromatic polyisocyanates are the isomers and derivatives of TDI and MDI.

Exemplary aliphatic polyisocyanates include isophorone diisocyanate, cyclohexane diisocyanate, hydrogenated diphenylmethanediisocyanate (H$_{12}$MDI), 1,6-hexamethylenediisocyante and the like. Of these, hexamethylenediisocyanate and H$_{12}$MDI are most preferred.

Biuret, urethane, urea, uretonimine and/or carbodiimide containing derivatives, including prepolymers, of the foregoing polyisocyanates are also suitable.

In preparing the polyurethane, the polyisocyanate is employed in an amount to provide about 0.9 to about 1.5, preferably about 1.0 to about 1.25, more preferably about 1.0 to about 1.05, isocyanate groups per active hydrogen-containing group present in the reaction mixture. These ratios of isocyanate groups to active hydrogen-containing group are referred to herein as isocyanate index. Lesser amounts of polyisocyanate produce a inadequately cured polymer whereas greater amounts thereof tend to form undesirable crosslinking.

A composition of the invention is advantageously reacted with the polyisocyanate by forming a mixture therewith and introducing the mixture into a suitable mold for curing. Conventional casting techniques may be used, wherein the components are mixed and poured into the mold, where they cure upon heating. However, especially when more reactive components are used, it is preferred to conduct the reaction using a reaction injection molding (RIM) process. In such process, the components are subjected to high shear impingement mixing and immediately injected into a closed mold where curing takes place. In either the conventional casting or RIM techniques, in-mold curing takes place at least to an extent that the part retains its shape during demolding and subsequent handling. However, complete curing, i.e., curing to a point at which no additional discernable reaction occurs, may take place either in the mold or in a post-curing step which is conducted after demolding. In the practice of the invention, the postcuring step is preferably avoided. If needed, postcuring of the polyurethane is advantageously conducted at a temperature of about 250° F., but preferably less than about 350° F., for a period of about 1 minute to about 24 hours, preferably about 1 minute to about 3 hours because postcuring for these times produces polyurethanes having relatively better physical properties.

While the invention is useful in forming any polyurethane, particularly a molded polyurethane, it is particularly useful in the preparation of elastomeric polyurethanes using automated RIM processes. The invention is particularly important in producing high modulus RIM polyurethanes, preferably those having a flexural modulus greater than about 2,000 psi, more preferably greater than about 5,000 psi, most preferably greater than about 10,000 psi, and even more preferably greater than 20,000 psi as measured by the procedure of ASTM D-747-86. Polyurethanes of the invention are often used to prepare automobile parts such as fascia, molded window gaskets, bumpers, stearing wheels and the like, as well as for non-automotive uses such as beer barrel skirts, shoe soles and the like.

When polyurethanes prepared from the compositions of the invention are molded, particularly in a RIM process, they advantageously exhibit self release properties, that is, they release from a mold more easily than do polyurethanes containing the same other components, but not containing the combinations of urea and transition metal carboxylate of the invention.

The following examples are provided to illustrate the invention but are not intended to limit the scope thereof. All parts and percentages are by weight unless otherwise indicated. Examples (Ex.) of the invention are designated numerically, while comparative samples (C.S.), which are not examples of the invention, are designated alphabetically.

Examples 1-7; Catalytic Activity of Compositions Containing a Urea Compound, a Polyol, Ethylene Glycol, Zinc Lurate and an Amine An admixture of 10 parts by weight ethylene glycol and 2 parts of the urea compound indicated in Table 1 is formed by stirring at room temperature. After about 30 minutes, 100 parts by weight of a 5000 molecular weight, glycerine initiated poly(propylene oxide) which is ethylene oxide capped (hereinafter Polyol A) is added to the admixture and stirred for 15 minutes to form a first admixture. A second admixture of 2 parts by weight of zinc laurate with 7 parts by weight of difunctional, amine terminated poly(propylene oxide) having an average molecular weight of about 400, commercially available from Texaco Chemical Corp. under the trade designation Jeffamine ® D400 (hereinafter Amine A) is formed by stirring at about 65° C. for 30 minutes.

For each of Examples 1-7, 112 parts by weight of the first admixture is mixed with 9 parts by weight of the second admixture by stirring for 10 minutes at a temperature of about 20° C. to form a "B-Side" mixture. A sample of each "B-Side" mixture is thoroughly mixed within a sufficient sample of carbodiimide-modified diphenylmethanediisocyanate having an average equivalent weight of about 143 to produce a mixture having an isocyanate index of about 1.03.

The resulting mixture is quickly poured into a cup at room temperature, and the time from mixing the isocyanate and the "B-Side" mixture until a gel too stiff to stir manually is formed is recorded in Table I as the gel time.

For Comparative samples A-G, the procedure of Examples 1-7 is followed omitting the zinc laurate and Jeffamine ® D400. Gel times are recorded in Table I.

A gel time of about 40 seconds or less is interpreted as indicating that the corresponding formulation is sufficiently reactive to be commercially useful in a high pressure automatic RIM process.

TABLE I

| Candidate Urea | Comparative Samples No. | Comparative Samples gel time (sec.) | Example No. | Examples (gel time) (sec) |
|---|---|---|---|---|
| Phenyl urea | A | 100+ (no reaction) | 1 | Immediate reaction; semisolid at 59 sec. |
| 1,1,Dimethyl urea | B | 100+ (reacts slowly to a solid polymer) | 2 | Soft solid at 21 sec. |
| 1-methyl urea | C | 100+ | 3 | 26 |
| 1,3,Dimethyl urea | D | 100+ | 4 | 37 |
| 1,1,3,3,tetra-methyl urea | E | 100+ | 5 | 72 |
| 1,1,diethyl urea | F | 100+ | 6 | 26 |
| Trimethylene Urea | G | 100+ | 7 | 40 |

The data in Table I shows that, except when the urea is tetrasubstituted, formulations having polyol, glycol, urea compound, amine and zinc laurate in the "B-side" mixture exhibit sufficient reactivity to be useful in automatic RIM processes: whereas formulations not having the amine and zinc laurate do not exhibit sufficient reactivity.

Example 8: Rim Process Using Fromulation Containing Urea, Ethylene Glycol, Polyol, Amine, and Zinc Laurate and a Tin-Containing Catalyst A first admixture is prepared by stirring 93 parts by weight of the Polyol A into a mixture of 10 parts of ethylene glycol and 2 parts of (unsubstituted) urea for about 10 minutes at 25° C. 150 grams of dibutyl tin dilauryl mercaptide commercially available from Witco Corp. under the trade designation UL-1 (Catalyst A) is mixed with the first admixture. A second admixture is prepared by stirring 7 parts by weight of the Amine A and 2 parts by weight of zinc laurate for about 30 minutes at a temperature of about 60° C. The first and second admixtures are combined by putting both into the B-side of an Admiral 2000 RIM machine and mixing by stirring and circulation. The polyisocyanate of Example 1 is placed in the A-side of the machine. The machine is calibrated to a 1.03 index (ratio of isocyante groups to hydroxyl groups) by adjusting the machine to deliver the contents of the B- and A-sides at a weight ratio of 1.769 (B/A ratio).

The components are maintained at a temperature of about 80° F. A mixing pressure of about 2000 pounds per square inch (psi) is used. The machine is adjusted for a shot time of about 1.3 seconds.

A plaque mold having an upper and a lower plate is used. The lower plate is stripped and polished before a very light coat of wax is applied. This plate is buffed after each plaque until the fourth plaque is produced: the further buffing is unnecessary. The upper plate is waxed initially, but not additionally treated during the course of producing 20 plaques, all of which released easily from the mold.

The first 4 plaques are produced at a mold temperature of about 170° F. Then the mold temperature reduced to about 160° F. Demold times are 15 seconds at 170° F. and 20 seconds at 160° F.

Example 9 Rim Process Using Fromulation Containing Urea, Ethylene Glycol, Polyol, Amine, and Zinc Laurate The process of Example 8 is repeated except that the tin-containing catalyst is omitted: the A-side is maintained at 100° F.: the B-side is maintained at 110° F.: the mold temperature is 165° F.: the B/A ratio is 1.73: the demold time is 30 seconds. A light coat of wax is applied before molding begins. Seven plaques are produced which release easily from the mold.

The following physical properties of the polyurethanes formed in Examples 8 and 9 are measured according to the indicated ASTM procedures and are reported in Table II:

TABLE II

| Example No. | Ex. 8 | Ex. 9 |
|---|---|---|
| Polyol A | 93 | 93 |
| Amine A | 7 | 7 |
| Ethylene glycol | 10 | 10 |
| Urea | 2 | 2 |
| Zinc Laurate | 2 | 2 |
| Catalyst A | 0.3 | |
| Specific gravity[1] | 0.8959 | 0.994 |
| Flexural modulus[2] (psi) | 5106 | 5311 |
| Tensile strength[3] (psi) | 1999 | 2284 |
| Die C tear[4] (pli) | 200 | 240 |
| Elongation[5] % | 260 | 245 |
| Hardness[6] Shore A | 86 | 85 |

[1]as measured by the procedure of ASTM D-792-86.
[2]as measured in pounds per square inch (psi) by the procedures of ASTM D-747-86.
[3]as measured in psi by the procedures of ASTM D-638-84.
[4]as measured in pounds per linear inch (pli) by the procedures of ASTM D-624-86.
[5]as measured in % by the procedures of ASTM D-638-84.
[6]as measured in Shore A by the procedures of ASTM D-2240-86.

The data in Table II show that polymers having good physical properties can be formed using compositions of the invention with or without additional catalyst. The compositions are sufficiently reactive without additional (tin-containing) catalyst to give demold times of 30 seconds. For comparison, it is noted that similar demold times cannot be achieved using similar compositions not containing conventional polyurethane formation catalysts from which either the urea or the zinc laurate is omitted. When tin catalyst is used with the zinc laurate and urea, the reaction is so fast that it is inconvenient for use in most commercial RIM processes.

Examples 10-13 and Comparative Sample H Variation of Urea Concentration

The procedure of Example 1 is repeated except that urea is used as the urea compound and the concentration of urea is varied as indicated in Table III. Observed gel times are recorded in Table III.

TABLE III

| Example | Parts urea* | Gel Time in sec. |
|---|---|---|
| 10 | 0.25 | 100+ |
| 11 | 0.5 | 91+ |
| 12 | 1.0 | 63 |
| 13 | 2.0 | 19 |

*parts by weight per hundred parts polyol (Polyol A)

The data in Table III indicate that the reaction rate is dependent on the urea concentration.

For comparison it is noted that much longer gel times are observed when secondary amines, such as cyclohexyl amine, are substituted for the urea and when the zinc laurate is omitted.

Example 14 Preparation of a High Modulus Rim Polymer

The process of Example 8 is repeated except that the tin-containing catalyst is omitted: the A-side and B-side compositions are maintained at 100° F.: the mold temperature is 165° F.: the B/A weight ratio is 1:1.21: the demold time is 30 seconds: the mixing pressure is 2,000 psi: the shotime is 1.5 sec.: the isocyanate is a hard segment methylenediphenylisocyanate prepolymer having an isocyanate equivalent weight of 170, commercially available form The Dow Chemical Company under the trade designation MDI Prepolymer 1288. A light coat of wax is applied before molding begins. Sixty plaques are produced which release easily from the mold, with no evidence of failure.

The following physical properties of the polyurethanes formed in are measured according to the indicated ASTM procedures given in Table II, except that Heat Sag is measured according to the procedure of ASTM D-3769-85: Garner Impact at room temperature and −20° C. are measured according to the procedure of ASTM D-3029-84 are reported in Table IV:

TABLE IV

|  | Example 14 |
|---|---|
| Polyol A | 93 |
| Amyl amine | 1 |
| Amine A | 7 |
| Ethylene glycol | 23.5 |
| Zinc Laurate | 2 |
| urea | 2 |
| Specific gravity | 0.996 |
| Flexural modulus (psi) | 83234 |
| Tensile strength (psi) | 3906 |
| Die C tear (pli) | 720 |
| Heat Sag 4" overhang (mm) | 9 |
| Garner Impact at room temperature (ft. lb.) | >320 |
| Gardner Impact at −20° C. (ft. lb.) | 60 |
| Elongation % | 188 |
| Hardness Shore D | 64 |

The data in Table IV show that the compositions of this invention are suitable for use in preparing high modulus RIM polyurethanes having properties suitable for such applications as bumpers, facia, and automobile body panels.

Example 15 Preparation of an Integral Skin Foam Using a Blowing Agent

A first admixture is prepared by stirring 1 lb. urea and 8 lb. of ethylene glycol: then adding 100 pounds (lb.) of Polyol A and 13 lb of trichlorfluoromethane, commercially available from DuPont de Nemours under the trade designation Freon 11 for about 10 minutes at 25° C. A second admixture of 2 lb. of zinc laurate, and 7 lb. of Amine A is formed by heating to 65 C and stirring for about one hour. The first and second admixtures are combined and stirred at 25° C. for 20 minutes. The resulting combination is placed in the "B-side" tank of an Admiral 2000 RIM machine. The isocyanate of Example 13 is placed in the "A-side" tank. The machine is operated under the following conditions:

| component temperatures °F. | 80 |
|---|---|
| Mixing pressure, psi | 2000 |
| shot time, sec. | 1.0 |
| through put, lb./sec. | 3.0 |
| ratio of A to B side (1.05 index) | 0.55 |
| mold temperature °F. | 122 |

Fifty releases of a plaques measuring 23.25 × 8.5 × 0.75 inches are obtained after one treatment of a light spray coating of a wax mold release commercially available from Chem Trend Corporation under the trade designation Chem Trend RT-2002. By comparison, about one release is expected from the same treatment of a mold used to produce plaques of the same formulation but with a catalyst such as dimethyl tin dilaurate in place of the zinc laurate and urea in Example 15.

The properties of the integral foam are measured as in Example 14 and are reported in Table V:

TABLE V

|  | Example 15 |
|---|---|
| density (kg/m$^3$) | 350 |
| Tensile strength (psi) | 351 |
| Die C tear (pli) | 54 |
| Elongation % | 180 |

The data in Table V shows integral skin foams obtained in the practice of the invention have properties suitable for use in applications such as steering wheels, headrests and arm rests.

What is claimed is:

1. A compatibilized active hydrogen compoundalkylene glycol composition comprising components:
   (A) a relatively high equivalent weight active hydrogen compound having an average of at least about 1.8 active hydrogen containing groups per molecule and an average molecular weight of from about 500 to about 5000 per active hydrogen containing group:
   (B) an alkylene glycol which is incompatible with component (A) at the relative proportions thereof present in the composition: said composition having dissolved therein:
   (C) a compatibilizing and catalytic amount of an additive containing (1) a urea compound and (2) a transition metal salt of a carboxylic acid wherein said metal is selected from Groups I-B, II-B, V-A, IV-B, V-B, VI-B, VII-B or VIII of the Periodic Table of the Elements said composition containing a sufficient quantity of at least one amine group-containing material such that component (2) is soluble in said composition.

2. The composition of claim 1 wherein component A is at least one amine terminated polyether polyol.

3. The composition of claim 2 containing an amine compound different from amine compounds present in component (A).

4. The composition of claim 3 wherein the amine is an unsubstituted or ether-substituted aliphatic or cycloaliphatic primary or secondary mono-amine compound a trialkyl amine: a hydroxyl amine: a tertiary amine: an amine terminated polyether having a molecular weight less than about 500, hexamethylene diamine, diethylenetriamine: a hydrocarbyl substituted aromatic amine: or a mixture thereof.

5. The composition of claim 2 wherein component (A) is the only amine group-containing material.

6. The composition of claim 1 wherein component (A) is at least one polyether polyol and wherein the composition contains an amine.

7. The composition of claim 6 wherein the amine is an unsubstituted or ether-substituted aliphatic or cycloaliphatic primary or secondary mono-amine compound: a trialkyl amine: a hydroxyl amine: a tertiary amine: an amine terminated polyether having a molecular weight less than about 500, hexamethylene diamine, diethylenetriamine: a hydrocarbyl substituted aromatic amine: or a mixture thereof.

8. The composition of claim 1 wherein the transition metal carboxylate salt has metal cation selected from Ti, Zr, Ta, Cr, Mn, Mo, Fe, Co, Ni, Cu, Sb, Bi, and Zn.

9. The composition of claim 8 wherein the transition metal carboxylate salt has metal cation selected from Zn, Cu, Sb, and Cd.

10. The composition of claim 9 wherein the transition metal carboxylate salt has a Zn cation.

11. The composition of claim 9 wherein the transition metal carboxylate salt has a carboxylate anion having from about 8 to about 21 carbon atoms.

12. The composition of claim 8 wherein the urea compound is represented by Formula I

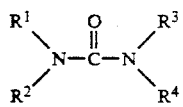

wherein $R^1$, $R^2$, $R^3$ and $R^4$ are inert substituents.

13. The composition of claim 12 wherein in Formula I each of $R^1$, $R^2$, $R^3$, and $R^4$ are independently selected from the group consisting of hydrogen, alkyl groups, aryl groups, arylalkyl groups, cycloalkyl groups, which groups are unsubstituted or inertly substituted.

14. The composition of claim 13 wherein in Formula I, at least two of $R^1$, $R^2$, $R^3$, and $R^4$ are hydrogen.

15. The composition of claim 14 wherein in Formula I, at least two of the hydrogen atoms are on the same nitrogen atom.

16. The composition of claim 15 wherein in Formula I, at least three of $R^1$, $R^2$, $R^3$, and $R^4$ are hydrogen atoms.

17. The composition of claim 11 wherein the urea compound is urea.

18. The composition of claim 1 which loses less than about 50 percent of its reactivity in forming polyurethanes when the composition is stored for a period of at least about 6 months at about 25° C.

19. The composition of claim 1 wherein there is less than about 0.001 weight percent tetravalent organo tin catalyst which loses its activity in the presence of an amine based on weight of composition.

20. A polyurethane polymer which is the reaction product of a polyisocyanate and the polyetheralkylene glycol composition of claim 1.

21. The polyurethane polymer of claim 20 wherein the polyurethane polymer is formed in a reaction injection molding process.

22. The polyurethane polymer of claim 21 wherein the polymer has a demold time of less than about 60 seconds.

23. The polyurethane polymer of claim 22 wherein the polymer has a demold time of from about 1 to about 30 seconds.

24. The polyurethane polymer of claim 22 wherein the polymer has a flexural modulus of at least about 5,000 psi.

25. The polyurethane polymer of claim 20 wherein the polymer has a density from about 75 to about kg/m3 and has a demold time of less than about 2 minutes.

26. The polyurethane polymer of claim 19 wherein the polymer is an integral skin foam and has a demold time of less than about 2 minutes.

27. The polyurethane polymer of claim 26 wherein the polymer is an integral skin foam and in the form of a shoe sole or shoe inner sole.

28. A compatibilized active hydrogen compound-alkylene glycol composition comprising components (A) at least one relatively high equivalent weight active hydrogen compound: (B) an alkylene glycol which is incompatible with component (A) at the relative proportions thereof present in the blend: and (C) a compatibilizing and catalytic amount of an additive containing (1) a urea compound and (2) a transition metal carboxylic acid salt: and (D) when component (A) does not have amine groups, at least one amine.

29. The composition of claim 28 wherein component D is present in amounts of from about 0.5 to 20 parts per hundred parts: component (2) is present in amounts of from about 0.1 to 10 parts per hundred parts both based on parts by weight of the composition: and the weight ratio of component (1) to component (2) is from about 1:4 to about 5:1.

30. A polyurethane polymer prepared from a reaction mixture comprising an isocyante component: a relatively high equivalent weight active hydrogen compound, an alkylene glycol which is incompatible with the active hydrogen compound at the relative proportions thereof present in the composition, an amine compound and a compatibilizing and catalytic amount of an additive containing (a) a urea compound and (b) a transition metal carboxylic acid salt.

* * * * *

UNITED STATES PATENT AND TRADEMARK OFFICE
CERTIFICATE OF CORRECTION

PATENT NO. : 5,070,110

DATED : December 3, 1991

INVENTOR(S) : Robert Carswell and Hugo E. Bernardi, both of Lake Jackson, Tex.

It is certified that error appears in the above-identified patent and that said Letters Patent is hereby corrected as shown below:

On the title page, Column 2, OTHER PUBLICATIONS, first reference should read -- R. C. Mehrotra and V. D. Gupta in J. Organometallic Chem. 4, pp. 145-150, 1965. --.

Column 16, line 31, delete "composition: " and insert -- composition; --.

Column 16, line 38, should read -- Table of the Elements; said composition containing --.

Column 16, line 50 should read -- phatic primary or secondary mono-amine compound: a --.

Column 16, line 51 should read -- trialkly amine; a hydroxyl amine; a tertiary amine; an --.

Column 16, line 54 should read -- triamine; a hydrocarbyl substituted aromatic amine; or a --.

UNITED STATES PATENT AND TRADEMARK OFFICE
CERTIFICATE OF CORRECTION

PATENT NO. : 5,070,110

DATED : December 3, 1991

INVENTOR(S) : Robert Carswell and Hugo E. Bernardi, both of Lake Jackson, Tex.

It is certified that error appears in the above-identified patent and that said Letters Patent is hereby corrected as shown below:

Column 16, line 63, delete " compound: " and insert -- compound; --.

Column 16, line 64, should read -- trialkyl amine; a hydroxyl amine; a tertiary amine; an --.

Column 16, line 67, should read -- triamine; a hydrocarbyl substituted aromatic amine; or a --.

Column 18, line 14, should read -- the polymer has a density from about 75 to about 450 kg/m3 --.

Column 18, line 25, delete " compound: " and insert -- compound; --.

Column 18, line 27, delete " blend: " and insert -- blend; --.

Column 18, line 30, delete " salt: " and insert -- salt; --.

UNITED STATES PATENT AND TRADEMARK OFFICE
CERTIFICATE OF CORRECTION

Page 3 of 3

PATENT NO. : 5,070,110

DATED : December 3, 1991

INVENTOR(S) : Robert Carswell and Hugo E. Bernardi, both of Lake Jackson, Tex.

It is certified that error appears in the above-identified patent and that said Letters Patent is hereby corrected as shown below:

Column 18, line 34, delete " parts: " and insert -- parts; --.

Column 18, line 36, delete " composition: " and insert -- composition; --.

Column 18, line 40, delete " component: " and insert -- component; --.

Signed and Sealed this

Twentieth Day of April, 1993

Attest:

MICHAEL K. KIRK

*Attesting Officer*     Acting Commissioner of Patents and Trademarks